No. 850,637. PATENTED APR. 16, 1907.
E. A. FOUNTAIN.
VEHICLE WHEEL.
APPLICATION FILED JAN. 30, 1906.

Witnesses
Geo. Ackman Jr.
C. C. Hines.

Inventor
E. A. Fountain,
By Victor J. Evans
Attorney

UNITED STATES PATENT OFFICE.

EVERLYN A. FOUNTAIN, OF SAN DIEGO, CALIFORNIA.

VEHICLE-WHEEL.

No. 850,637.   Specification of Letters Patent.   Patented April 16, 1907.

Application filed January 30, 1906. Serial No. 298,683.

*To all whom it may concern:*

Be it known that I, EVERLYN A. FOUNTAIN, a citizen of the United States of America, residing at San Diego, in the county of San Diego and State of California, have invented new and useful Improvements in Vehicle-Wheels, of which the following is a specification.

My invention relates to vehicle-wheels; and its primary object is to provide a novel and highly useful device of this character wherein the hub is resiliently mounted to take up and dissipate any violent shocks or jars resulting from irregularities in the surface over which the wheel is moving, whereby I provide a wheel upon which a steel or cushion tire may be used to accomplish the same results as does a wheel equipped with a pneumatic tire.

A further object of the invention is to provide novel means for housing the means for resiliently mounting the hub whereby to prevent foreign substances from coming in contact with the latter-named means and to protect it from the action of the elements, thereby insuring the proper action and adding life and durability thereto.

The invention consists in the construction, combination, and arrangement of parts hereinafter more fully described, claimed, and illustrated in the accompanying drawings, which show the preferred form of my invention, and in which—

Figure 1:
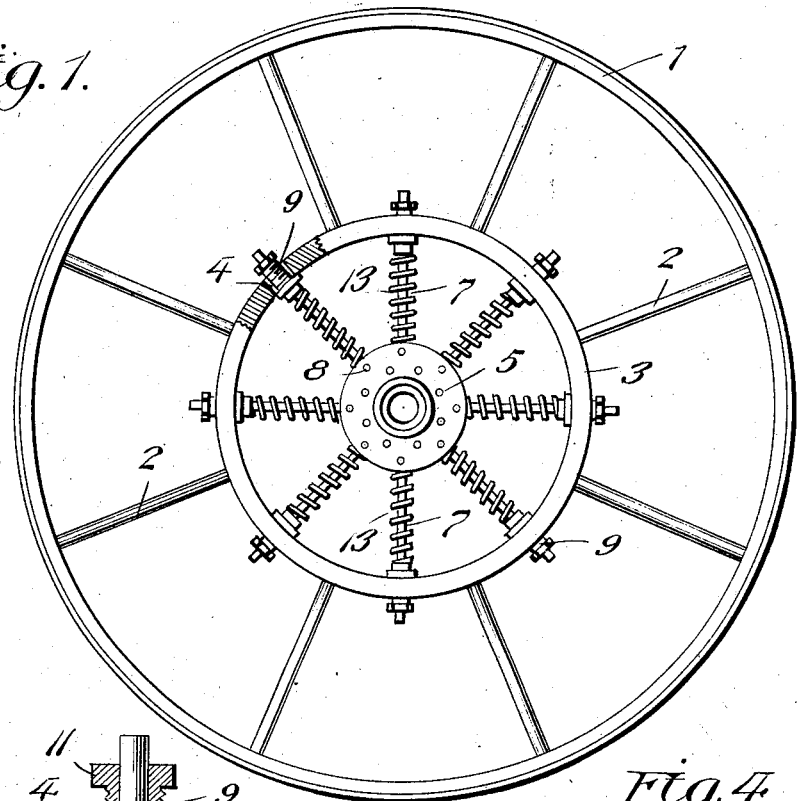
Figure 2:
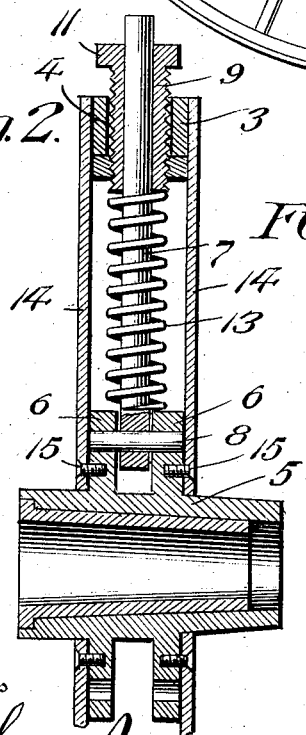
Figure 3:
Figure 4:
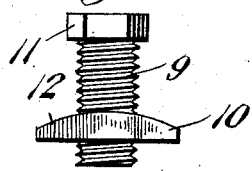
Figure 5:
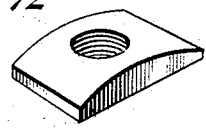

Figure 1 is the side elevation of a wheel constructed in accordance with my invention, the housing being removed. Fig. 2 is a cross-sectional view through the hub and one of the sets of devices for resiliently mounting the hub. Fig. 3 is a detail view of one of the auxiliary spokes or guide-pins. Fig. 4 is a view of one of the adjusting-screws and the coacting nut detached. Fig. 5 is a detail view of the nut.

Referring to the drawings, 1 designates the felly of the wheel, which may be of ordinary form and construction and provided with any suitable type of tire. Secured at their outer ends to the felly are spokes 2, fixed at their inner ends to an inner rim 3, the said rim being provided with a plurality of openings 4, arranged radially with relation to the center thereof.

The wheel-hub 5 is provided with a pair of spaced peripheral flanges 6, between which are mounted the inner ends of a plurality of radially-arranged guide-pins or auxiliary spokes 7, apertured at their said inner ends for the passage of pivot-pins 8, mounted in the flanges 6 and pivotally securing the guide-pins thereto to permit them to have freedom of movement circumferentially of the wheel. Mounted upon the outer ends of the guide-pins or auxiliary spokes are tubular adjusting nuts or sleeves 9, each externally threaded to adjustably engage a nut 10 and provided at its outer end with an adjusting-head 11. Each screw or sleeve 9 projects through one of the openings 4 in the inner rim and forms a support for the outer end of the coöperating guide-pin 7, which is free to slide or reciprocate therein, the screw being of sufficiently greater length than the depth of the opening to permit it to have a desired range of adjustment and also of less diameter than the opening to permit it to play therein, and thereby allow the guide-pin to swing within a prescribed range circumferentially of the wheel.

Each nut 10 is of oblong rectangular form and has a rounded outer face 12 to bear against the inner surface of the rim 3 and permit the adjusting-screw and outer end of the guide-pin to tilt freely or assume an angular position relatively to the rim during the travel of the wheel to secure the desired cushioning action, as hereinafter described.

Surrounding each guide-pin 7 is a coiled cushioning-spring 13, bearing at its inner end against the flanges 6' and at its outer end against the nut 9, which springs exert their expansive force to normally retain the hub centrally of the rim. It is apparent through virtue of the interposition of these springs between the hub and nuts 10 bearing upon a fixed portion of the rim-frame—namely, the stationary rim 3—that the hub is resiliently mounted with relation to the wheel and that when the tire of the wheel engages an irregularity in the surface over which it is traveling the usual shock or jar incident thereto will be taken up and dissipated by the springs, thereby establishing a cushioning action whereby the wheel is adapted to accomplish the same results that are obtained by the usual wheel equipped with the pneumatic tire and to render riding of the vehicle easy and without jar.

In order to inclose the springs and protect the same from foreign substances and the action of the elements, cover plates or disks 14 are arranged upon opposite sides of the same and are fastened to the hub of the wheel in any preferred manner, as by the use of screws 15, passing through said plates and entering the flanges 6. These plates ride in contact with the sides of the rim 3, but are free from connection therewith, thus permitting the frame of the wheel and hub to have proper relative movement for the cushioning action. The plates by their engagement with the rim prevent lateral strain upon the guide-pins, as well as protecting the springs 13.

The ends of the nuts 10 contact with the inner faces of the cover-plate 14, and the nuts are thereby held from rotation, and they are also held in contact with the inner face of the rim by the expansive pressure of the cushioning-springs 13. It will thus be seen that by turning the screws 9 in one direction or the other the tension of the springs will be increased or diminished to vary their resistance or cushioning action.

In operation the pivotal connection of the guide-pins 7 with the hub and their sliding connection as well as pivotal connection with the rim 3 permit said pins to move radially with relation to the axis of the wheel as well as circumferentially thereof while the wheel is in motion, so that as the wheel revolves a continual cushioning action will be obtained and all jars and shocks taken up, thus giving the wheel the same ease of action as though it were equipped with a pneumatic tire.

Having thus described the invention, what is claimed as new is—

1. A wheel comprising a hub, a felly, an inner rim fixed to the felly and provided with openings therein, a plurality of radially-arranged guide-pins pivotally connected at their inner ends with the hub and suitably connected at their outer ends with the rim to have radially-slidable and pivotal movement circumferentially to the hub, springs surrounding said pins between the rim and hub, and means upon the outer ends of the pins and disposed within the rim-openings for adjusting the springs to vary their resistance.

2. A wheel comprising a hub, a felly, an inner rim fixed to the felly and provided with openings therein, a plurality of radially-arranged guide-pins pivotally connected at their inner ends with the hub and extending at their outer ends through the openings in the rim, stationary nuts bearing against the inner surface of the rim, coiled springs surrounding the guide-pins and bearing at their inner ends against the hub, and adjusting-screws mounted upon the outer ends of the guide-pins and movable in the rim-opening and engaging the outer ends of the springs.

3. A wheel comprising a hub, a felly, an inner rim fixed to the felly, connections between the hub and rim pivotally attached to the hub and slidably and pivotally connected with the rim, cushioning-springs associated with said connections, and shields disposed on opposite sides of said connections and springs between the hub and rim and fixedly connected with one of said parts and movably engaging the other part.

4. A wheel comprising a hub, a felly, an inner rim fixed to the felly, guide-pins pivotally connected at their inner ends to the hub and slidably and pivotally connected at their outer ends to the rim, cushioning-springs associated with said pins, and cover-plates on opposite sides of said pins and springs, said plates being fixed to the hub and movably engaging the rim.

In testimony whereof I affix my signature in presence of two witnesses.

EVERLYN A. FOUNTAIN.

Witnesses:
F. W. Downs,
J. Q. Finch.